(12) United States Patent
Lees et al.

(10) Patent No.: US 7,774,442 B2
(45) Date of Patent: Aug. 10, 2010

(54) DISTRIBUTED CONFIGURATION MANAGEMENT USING LOOSELY-COUPLED ACTION-STYLE DOCUMENTS

(75) Inventors: William B. Lees, Kirkland, WA (US);
Rajagopalan B. Narayanan, Redmond, WA (US); Jeffrey B. Parham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 164 days.

(21) Appl. No.: 12/147,202

(22) Filed: Jun. 26, 2008

(65) Prior Publication Data

US 2009/0327457 A1 Dec. 31, 2009

(51) Int. Cl.
*G06F 15/16* (2006.01)
*G06F 12/00* (2006.01)
(52) U.S. Cl. ........................ 709/221; 709/220
(58) Field of Classification Search ......... 709/220–221, 709/217–218, 224–229, 250
See application file for complete search history.

(56) References Cited

U.S. PATENT DOCUMENTS

| | | | |
|---|---|---|---|
| 6,817,008 B2 | 11/2004 | Ledford et al. | |
| 6,970,813 B1 | 11/2005 | Houlding et al. | |
| 7,188,335 B1 | 3/2007 | Darr et al. | |
| 7,194,730 B2 | 3/2007 | Pramberger | |
| 2002/0147726 A1 | 10/2002 | Yehia et al. | |
| 2002/0184525 A1* | 12/2002 | Cheng | 713/201 |
| 2003/0217076 A1 | 11/2003 | Heptinstall et al. | |
| 2005/0108684 A1 | 5/2005 | Sohn et al. | |
| 2005/0203953 A1 | 9/2005 | McGee et al. | |
| 2006/0242563 A1* | 10/2006 | Liu et al. | 715/513 |
| 2007/0226259 A1* | 9/2007 | Kacin et al. | 707/104.1 |
| 2007/0226608 A1* | 9/2007 | Virk et al. | 715/513 |
| 2007/0245325 A1* | 10/2007 | Lapounov et al. | 717/140 |
| 2008/0104579 A1* | 5/2008 | Hartmann | 717/136 |
| 2008/0126317 A1* | 5/2008 | Stout et al. | 707/3 |
| 2009/0327301 A1* | 12/2009 | Lees et al. | 707/10 |

OTHER PUBLICATIONS

Choi et al., "Design and Implementation of XML-based Configuration Management System for Distributed Systems", vol. 1, Apr. 23-24, 2004, pp. 1-14.
Seifried et al., "Systems Management Framework for Distributed Environments", retrieved at <<http://www.alphaworks.ibm.com/tech/jmxframework>>, on Oct. 18, 2007, pp. 1-2.
Kay, Michael. XSLT 2.0 Programmer's Reference, 3rd edition, 2004, Wiley Publishing, Inc. ISBN 0-7645-6909-0, pp. 34-40, (29 pages).
World Wide Web Consortium. "XML Schema", May 2, 2001, pp. 1-28.

(Continued)

*Primary Examiner*—Zarni Maung

(57) ABSTRACT

Described is a technology in a distributed configuration network management environment, in which action-style documents are used as guides in processing structured documents to perform management tasks. For example, the action-style documents may be used by a standard stylesheet processor to validate a constitutional document, and process input lines of that constitutional document into output lines of a document. When executed, the output lines perform a management task. In this manner, for example, policy statements of an administrator are transformed into a single type of self-contained document that is consistently interpreted, and thus consistently executed, regardless of its source or when it was authored.

18 Claims, 8 Drawing Sheets

OTHER PUBLICATIONS

World Wide Web Consortium, "XML Schema Part 0: Primer Second Edition", Oct. 28, 2004, pp. 1-62.

World Wide Web Consortium, "XML Schema Part 1: Structures Second Edition", Oct. 28, 2004, pp. 1-164.

World Wide Web Consortium, "XML Schema Part 2: Datatypes Second Edition", Oct. 28, 2004, pp. 1-106.

World Wide Web Consortium, "XSL Transformations (XSLT)", Nov. 16, 1999, pp. 1-78.

http://www.schematron.com, "Schematron", Last viewed on May 10, 2010, pp. 1-9.

International Standard Organization (ISO), ISO/IEC 19757-3 Information technology—Document Schema Definition Language (DSDL)—Part 3: Rule Based Validation—Schematron, First Edition Jun. 1, 2006, pp. 1-38.

* cited by examiner

DISTRIBUTED CONFIGURATION MANAGEMENT USING LOOSELY-COUPLED ACTION-STYLE DOCUMENTS

CROSS-REFERENCE TO RELATED APPLICATION

The present application is related to copending U.S. patent application Ser. No. 12/147,118 entitled "Distributed Configuration Management Using Constitutional Documents" filed concurrently herewith, assigned to the assignee of the present application and hereby incorporated by reference.

BACKGROUND

In managing a network, customers install a configuration management solution, or several solutions, sometimes from multiple vendors. Customers often use configuration documents to organize management tasks.

One problem with such documents is the number and kind of configuration documents which need to be present in the network. Even in the context of a single configuration management solution, across the entire system there may exist different kinds of configuration documents, each containing policy statements about the desired configuration. These documents are expressed in different proprietary languages, even within a single solution. This is a burden because typically each document is in a slightly different format, and thus requires different versions of tools at different segments of the network for processing.

Another problem is that after configuration management solution are deployed as systems, the systems tend to drift or diverge from their original intention/business plans. For example, once a configuration management solution is formally deployed according to some plan, the actual computers managed by the IT staff drift out of the original inventory. Further, additional configuration documents are copied in by hand, configuration documents are edited, and/or configuration documents are assigned into fixed permanent configurations.

Another problem results from the fact that configuration management solutions work by requiring that combinations of particular format documents be used in specific combinations. The correct operation of such solutions depends on certain documents being used together in certain combinations. Over time, the system becomes fragile if these subtle co-relationships are not maintained.

In sum, problems arise from the distinct formats of documents and/or the requirement that they often need to be used in special combinations. At the same time, the overall application of a specific business policy depends on an undefined combination of particular, yet different, documents.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which action-style documents are used as guides in processing structured documents to perform management tasks. For example, the action-style documents may be used by a standard stylesheet processor to validate a constitutional document, and process input lines of that constitutional document into output lines of a document. When executed, the output lines perform a management task. In this manner, for example, policy statements of an administrator are transformed into a single type of self-contained document that is consistently interpreted, and thus consistently executed, regardless of its source or when it was authored.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards distributed configuration management through the use of set of one or more data structures. In one implementation, the data structure is in the form of a structured document, referred to herein as a constitutional (or sometimes governing) document in part because of its inherent structure in governing management tasks. When constitutional documents of particular types are configured, they are transformed by action-style documents which are executed to validate the constitutional documents.

In a computer network configuration management solution, such action-style documents provide a form of managed-computer processing where activities are achieved through a document-transformation programming language; (XSLT stylesheet is one example of a suitable transformation language, comprising a functional language that does not have side-effects, nor 'assignment statements'). In such a solution, the document transformations are structured according to specific roles or responsibilities of the action-style documents. To this end, policy rules in a group policy processing system are evaluated in an orderly and conflict-free way using XSLT style sheets; in other words, policy rules are functionally decomposed into XSLT style sheets. When processed by an agent, whatever arbitrary set of policy rule units are present automatically self-prioritize according to each document's internal structure and arrangement.

While some of the examples described herein are directed towards an XML or XML-like document structure, it is understood that these are only example formats. Indeed, any suitable structured document and/or format may be used, e.g., as long as the data therein is structured in a consistent and predictable way. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and network management in general.

Figure 1:
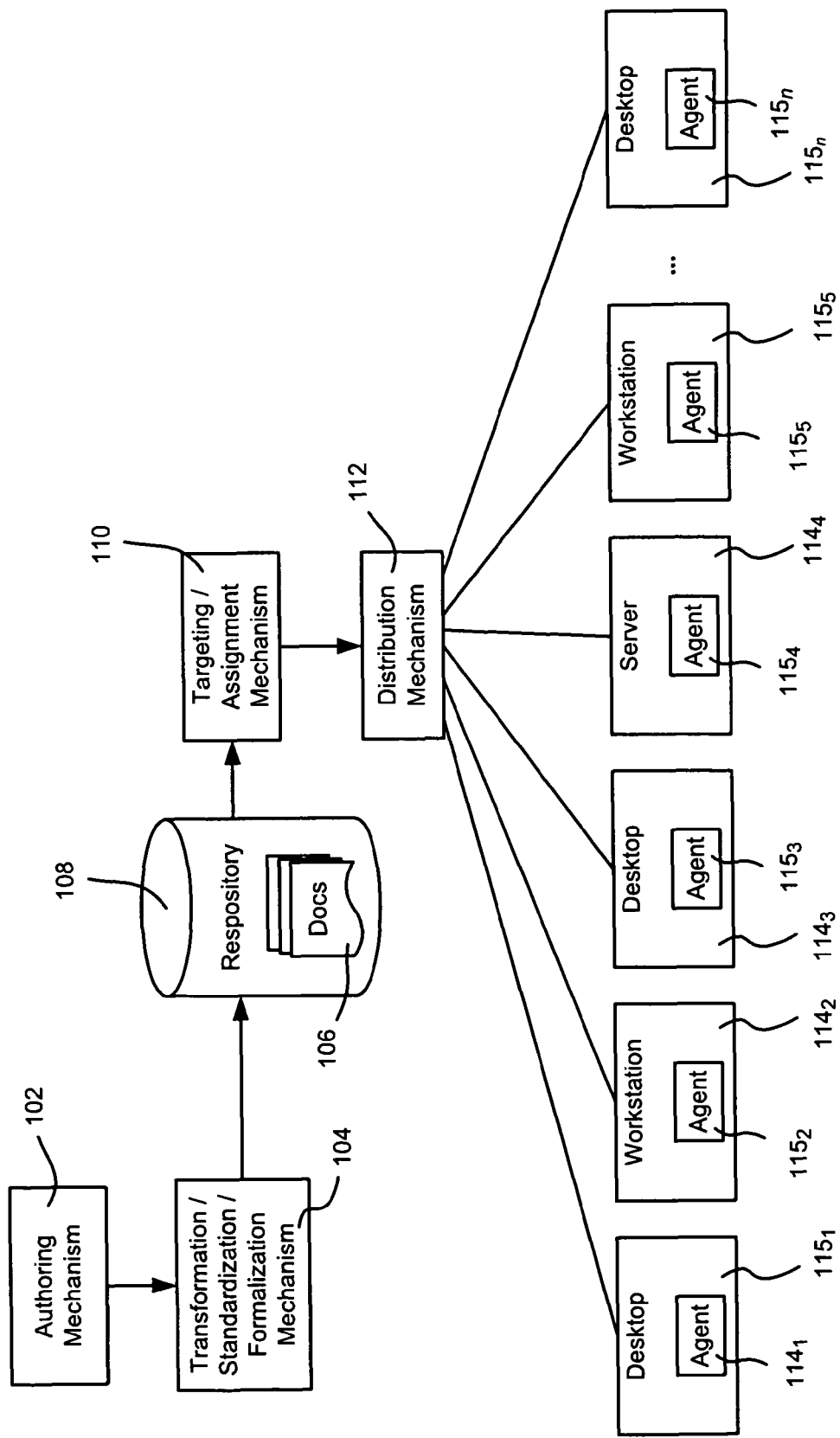
FIG. 1 is a block diagram representing a distributed configuration management environment in which constitutional documents may be used to implement management tasks.

Turning to FIG. 1, there is shown an environment in which constitutional documents may be used distributed network configuration management. An authoring mechanism 102 or the like generates the content of each document, such as via a user interface and/or tools by which various desired policy and other management configuration tasks are specified. A transformation/standardization/formalization mechanism 104 processes the author-provided information into a constitutional document, which in FIG. 1 is saved along with other such documents in a set 106 maintained in a repository 108 or the like. As described below, the transformation is accomplished via processing that relies on action-style documents. Indeed, the transformation may be included in a transform part of one constitutional document, as a stylesheet that is a factory for generating the other constitutional document; as such, it may be treated exactly as other constitutional documents, in terms of being held in a repository, being targeted/assigned, and being distributed to processing nodes.

Some time thereafter, a targeting/assignment mechanism 110 accesses the repository 108 to locate one or more documents that are desired to perform a management task. A distribution mechanism 112 provides the documents to various machines $114_1$-$114_i$ in the network, shown in FIG. 1 as desktop computers, one or more servers and/workstations. Note that there may be intermediate staging points which hold the documents to assist in distribution; although FIG. 1 shows the distribution mechanism as a single central point, this is only one example alternative, e.g., there may be more than one distribution mechanism, and/or any given distribution mechanism may employ multiple hops, or store-and-forward, between the repository and the recipients. Each such machine includes a corresponding agent $115_1$-$115_i$ that interprets the document or documents to perform the specified task or tasks. As described below, this may be accomplished by standard XML processors.

Note that each of the mechanisms in FIG. 1 may operate independently of one another. Thus, a constitutional document may be authored well before it is used, even years beforehand. Similarly, a constitutional document may be reused anytime after it enters the repository 108. Moreover, not only may a constitutional document be combined with other documents, the combination may take place with a later document that is authored long after the constitutional document was authored.

Further note that this chain of distributing documents may itself be part of a larger scheme. For example, there may be a hierarchy of such hierarchies, where one chain distributes 'factories' to servers, which then have their own authors and repositories and so forth.

Figure 2:
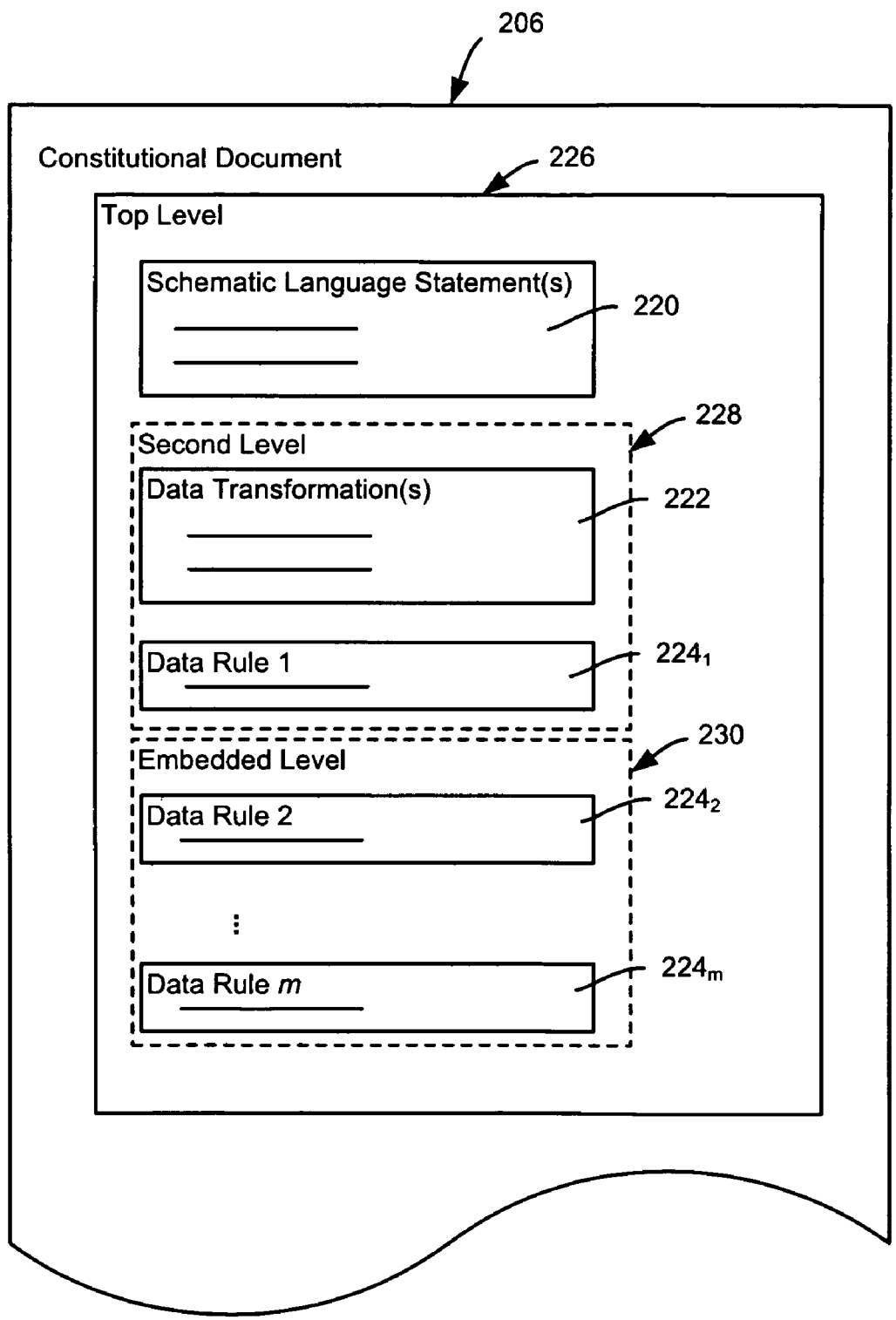
FIG. 2 is a representation of an example structure of a constitutional document.

FIG. 2 shows the general structure of a constitutional document 206; such structure is further described in the aforementioned related patent application Ser. No. 12/117,118. As generally represented in FIG. 2, to provide such a governing document format, various (e.g., three) kinds of descriptive language syntax are used within each and every single document. This includes a "schematic" statement 220 comprising a statement of schema or type or kind of data; such statements provide templates (like 'forms' or 'molds') of which data instances may belong.

Another type is "stylistic transformative" syntax, comprising a series of data transformation declarations 222 describing one or more mathematic functions, whose processing results in the generation of some data instance. Such a data instance may be intermediate in nature, may be subject to further step-wise transformation to ultimately result in an instance conforming to a schema type, and/or may be subject to rules.

Another type of syntax is referred to as "ruling," generally comprising a series of data rules $224_1$-$224m$ such as if-then and/or if-then-else conditional rules with regard to the validity of data in the instances of the schema. Note that each kind of descriptive language syntax can be considered concrete in that statements may be interpreted directly, e.g., without requiring referencing external authorities for interpretation or disambiguation.

With respect to the statement language depth of a document, any single governing document comprises a nested series of layers of languages. A topmost or outer layer ('top level') 226 of language encloses the further statements within the document. Occurrences of embedded language may be present, which may appear at various points in a context of being nested within an enclosing language statement of a differing kind. Note that in one implementation, schematic language statements appear only at the top-level layer.

Ruling and stylistic language statements may appear at (either or both of) a second-level 228 or an embedded-level 230. The second-level 228 refers to language embedded as immediate child of the top-level; the embedded-level 230 refers to language embedded at further depths, beyond the second-level.

In one example, the overall document is in the pattern of an XML schema, with embedded XML Schematron rules (and particularly an embedded XML XSLT Stylesheet). Thus, in this example, the set of statements corresponding to a stylesheet are followed by the declaration of the schema type, followed by a rule blob. The document thus has the conceptual entities of type, rule and action style in one structure, providing a constitutional document.

Figure 3:
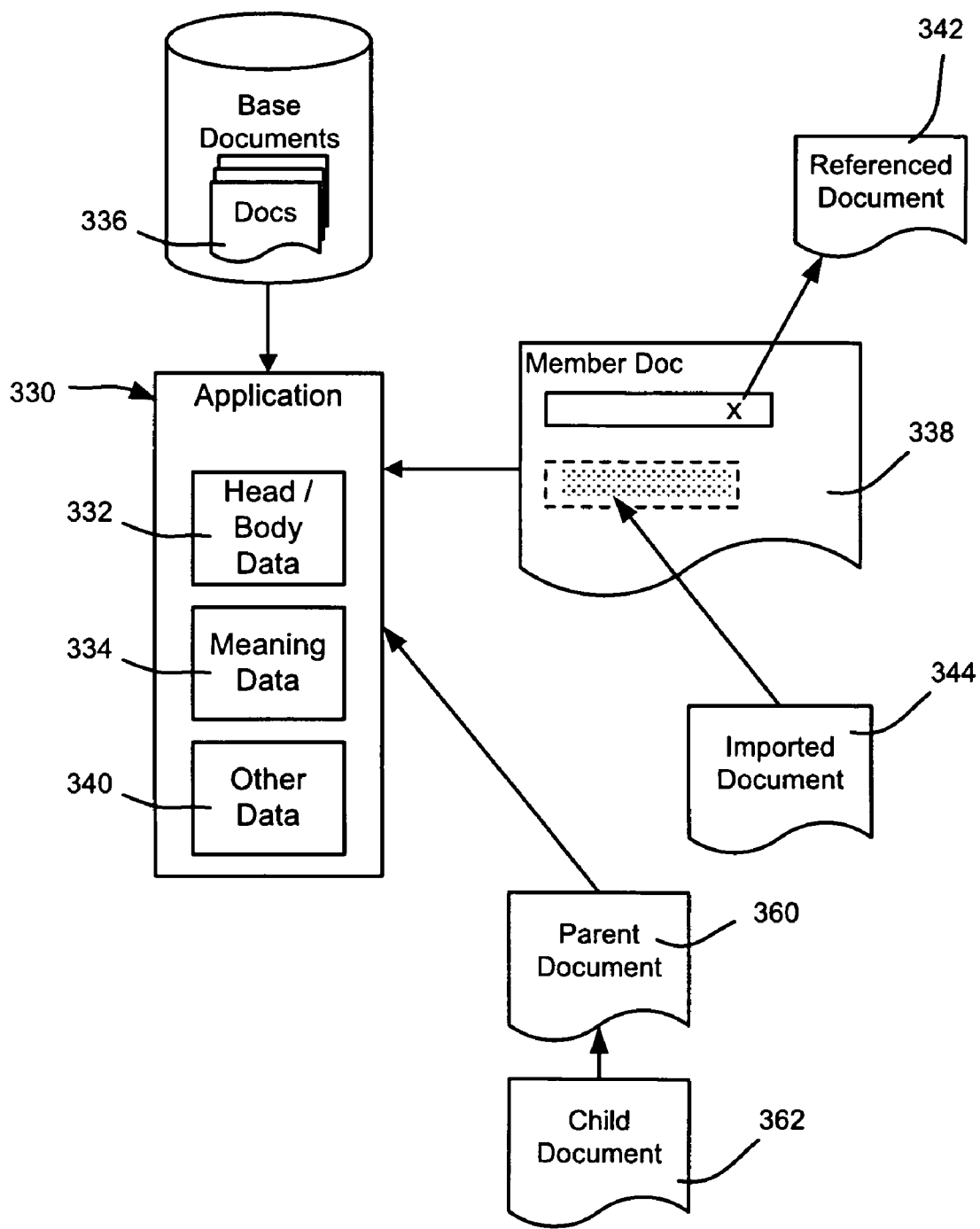
FIG. 3 is a block diagram representing relationships between an application and example structured documents.

FIG. 3 summarizes various other aspects of an application 330 and various document concepts. In FIG. 3, the example application 330 includes (or otherwise references) head body data 332 that when present specifies document load ordering, and meaning data 334 that as described below, specifies which document or documents are base documents 336 and which is a member document 338 (note that multiple member documents may be specified). The application may include other data 336.

As also represented in the example of FIG. 3, the member document 338 may include a reference to a referenced document 342. The member document 338 also may import content from an imported document 344.

Still further shown in FIG. 3 is the concept of a parent-child relationship, shown via a parent document 360 and child document 362. A child document is one that references a parent document; a parent may thus have multiple child documents. A child document also may be a parent to another child, and so on. When two items are in a parent-child situation, the parent is evaluated before the child; e.g., a model stylesheet, which is a child, declares another model stylesheet to be its parent, (that is unless the model declares that it has a base, then this stylesheet is not a child, whereas when a model declares that it has a base and names another model as its base or parent is the child, and the named model is the parent).

In general, a parent document is extended by a child document, e.g., an administrator authors a parent document, and then later wants to extend that document with some content, and may do so by authoring a child document that specifies its relationship with the parent document.

Figure 4:
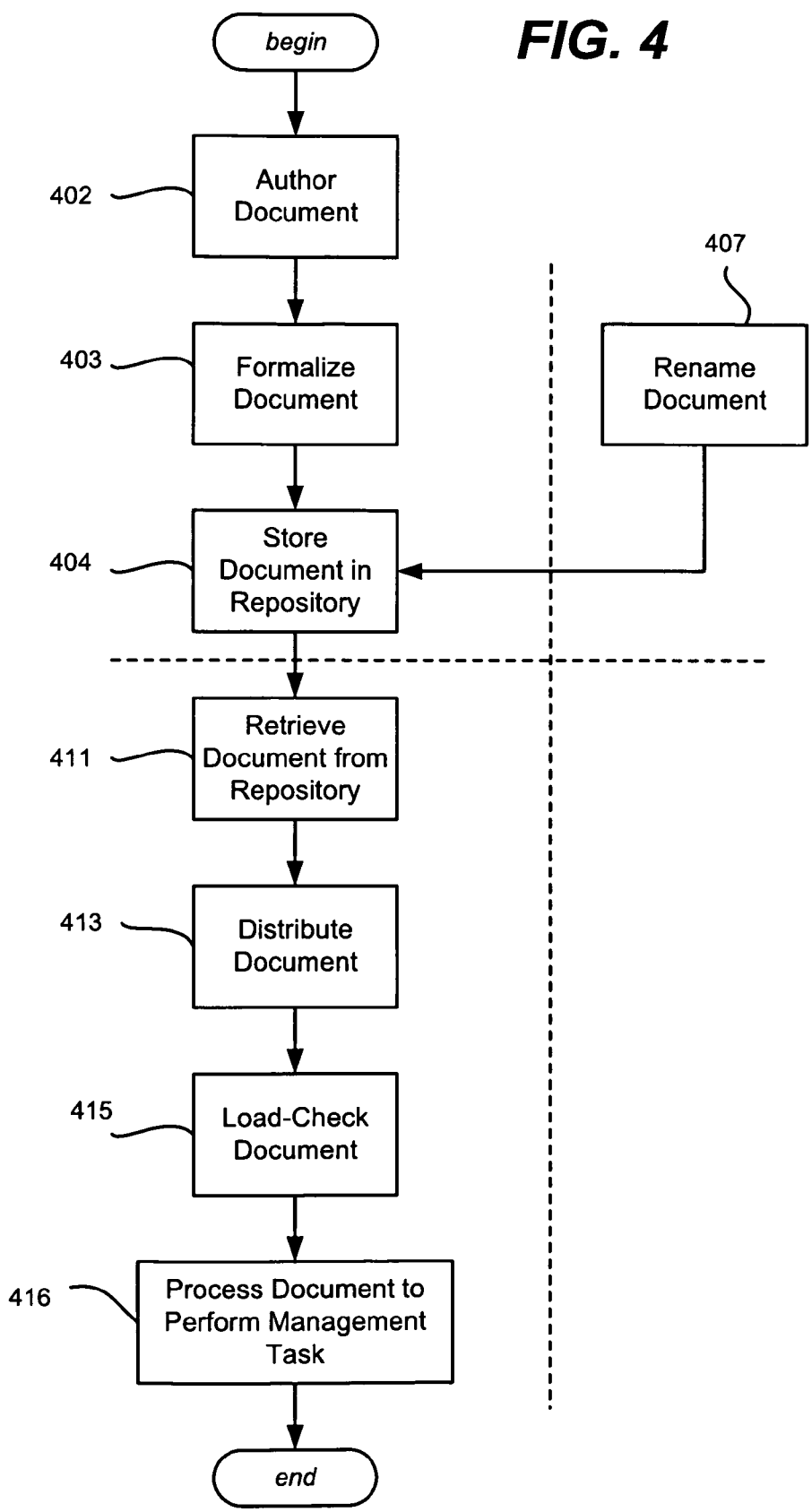
FIG. 4 is a flow diagram showing various aspects of a structured document.

FIG. 4 summarizes various aspects with respect to a document, beginning at step 402 which represents the authoring of the document. Step 403 represents formalizing the document in some way, e.g., converting an administrator's intent as entered into a user interface into the document structure whose conformance can be evaluated with respect to performing a management task. Step 404 represents storing the document in a repository, where it can be accessed and optionally renamed (step 407). Note that in FIG. 4, the dashed lines generally indicate independent operations in time and/or space, e.g., renaming may take place at any time.

Sometime later, (again as indicated by the dashed lines), the document is retrieved (step 411) from the repository, whether alone or in a set with other such documents. The document may be distributed via step 413 to one or more agents, where it is load-checked (step 415), and if correct, processed to perform the management task, such as to ensure conformance of the agent's machine to a policy.

One aspect of the document is to provide a way for administrators to specify one or more units of expressed desire with respect to conformance evaluation decisions made during processing actions driven by the document. To this end, the constitutional document structure, e.g., in the form of XML Schema containing embedded documents in the form of XML standard processing languages, is capable of being executed by XML standard processors to perform evaluation and transformation tasks, e.g., by processors such as an XML Schema validator, XML Schematron validator and XSLT stylesheet. In this manner, standard XML processors, used in a configuration management processing agent, can be completely predictably directed in the order of their task activity, using only the aggregate structure present, within the context of a collection with documents having the same structure. The intent-structure of each document constitutes a total task activity that is predictable and orderly in execution. However, a management authority may direct the agent to change the names of the documents in a given set and thereby reprogram the total task activity. In general, the processing requirements are simplified to require only the performance XML standard processing, using XML standard languages and evaluation semantics. The orderly evaluation of rule contract documents is expressed within the combined structure of the documents themselves, without requiring any subject interpretation. The activity at any computing resource may evolve independently over-time, without disruption to the meaning of documents already issued.

With respect to action-style documents, three kinds of acting document structures are described, including a document that acts in a rule-factory role, a document that acts in a rule-construct role, and a document that acts in a type-function role. These correspond to different kinds of document transforming activities, include a factory-time activity, which uses a processor of XSLT stylesheet, and is guided by a document of role rule-factory; and a rule-function activity, which uses various processors (e.g., Schema, Schematron, Stylesheet), and is guided by the documents of role rule-construct, type-function and base-type.

In general, via the transformation/standardization/formalization mechanism 104 of FIG. 1, a human-input statement of expressed desire directed towards machine configuration, when written in a valid instance of a management rule language, is transformed into an intent-structure document. More specifically, configuration rule language documents have some general patterns, which can be used to transform them (e.g., using a stylesheet) into a new form that is functionally-decomposed. This transformation is the functional decomposition method for rule languages.

In general, an XML standard XSLT stylesheet processor (or equivalent) operates by running a document transformation. Such a processing run may be characterized as a single logical step, in that a processor does the transformation. To this end, the processor run operates by taking a guide document, reading an input document and generating an output document. The guide document is an action-style document, as described herein.

Any given processing run step is self-contained and predictable, in that it is controlled by the combination of the documents that are present at the time of the processing run step. Any given processing run step is independent; what happens in this step does not depend on other computers, other users or what other processing is going on at the computer at the same time.

Configuration management with documents in this made up of single processing run steps that are performed across the computers involved in the management solution. These runs happen on different machines and may take place at different times/on different schedules). Processing runs may or may not happen simultaneously from the perspective of different users or computers. While each processing step is an independent operation, through overall orchestration the processing collectively serves to bring about overall management and conformance. At the same time, each of the machines do as much work as possible for themselves, based on what kind of action-style document is guiding a particular processing run step that is happening at some time and place.

As described above, the administrator writes some statement corresponding to an expressed desire over some aspect of machine configuration state. From there, that original statement is transformed into something enforceable, namely a constitutional document that is enforced when loaded and processed. To this end, as described herein, each authored, originating administrative statement is systematically translated, via one or more action-style documents.

In one implementation, action-style documents are characterized by certain (e.g., three) specific forms of language documents. When a language document instance serves a 'signature definition' purpose, it is a signature definition action style; the other types of action-style documents serve for conformance policy evaluation purposes, and scanner extension purposes. Note that this does not mean that every time there is a new original statement authored that there are three new action-style documents created; although there are three action-style documents, one of each kind, associated with the enforcement/enactment of a given statement, one or both of the other two kinds of documents may be reused action-style documents that already exist. This allows an administrator's request to be carried out into the future, regardless of changes, while not inhibiting change.

To this end, action-style documents provide a construction design pattern for how to build a general, constitutional configuration management solution using only XML standard XSLT stylesheet processors (or equivalent). It is also a construction design pattern for how to build XSLT stylesheet documents (or documents in a language of equivalent behavior), such that the expressed administrative intent can be carried out across the enterprise network in a way that remains consistent over time and space. As will be understood, this technology provides a way to decompose some statement by an administrator, who is expressing some desire about the configuration state of their machines, into loosely-coupled functional action-style documents, which then preserve the expressed intent as they carry out the activity on any computer at any time.

To this end, an original authored statement of administrator intent (e.g., as to some configuration state) is transformed and carried out by three action-style documents, one of each kind. Each original authored statement of intent corresponds to three action-style documents in the accomplishment of the request. The lifetime corresponds to those documents; as long as those documents are retained, the expressed intent remains and will continue to be carried out consistently.

In one implementation, the documents used by XSLT stylesheet processors (or equivalent) are linearly ordered, that is, the document need not require 'random access' to be understood. Instead, the processor reads or write the document in terms of linear read or write steps, where the order of the read or write steps corresponds to the order of appearance of the content items. In other words, the documents may be accessed sequentially, either for read or for write. Note that it is feasible for a processor to read a whole document in advance, index/sort it, and thus effectively reorder it, however that is not required for an action-style document.

To summarize, an existing document has its content (lexical tokens) processed in the order in which it was originally written. The content items in the document are in some linear order in terms of first, next and last. That order remains static by making the file content read-only after is written, e.g., by ensuring that the file content is present and has integrity in that it cannot change arbitrarily or be corrupted.

When a stylesheet processor reads a document, the processor only reads the items in the order they are present; the processing activity may read an item, discard it and move on, but any 'meaning' of a token appearing earlier in the file cannot be altered by the existence of a token later in the file. In other words, at the time the processor is reading that early item, it is able to act on it based solely on its presence in the document at that position.

When reading a document, the processor has only the option to reset its reading to the start of the document, read a current item, move to the next sequential item and detect the end of document. The processor only reads forward, or rests to the beginning.

When writing a document, the processor can only put an item into the output document at its current position, which implicitly moves the write cursor to the next position in anticipation of the next write. Once the processor writes an item, it cannot change its relative order. In other words, if the processor writes item #1 and then writes item #2, item #1 appear in the output document before item #2.

Such linear processing constrains the way the content is designed. The content needs to be correctly ordered, and thus the consistent understanding of the document does not change over time, because the order in the document is always in this order.

Turning to assembly in general, assembly is performed by an XML standard XSLT stylesheet processor, commercially available from many vendors. Action-style documents accomplish the activities of a distributed configuration management solution using only off-the-shelf XML standard XSLT stylesheet processors (or equivalents).

The assembly language is XML standard XSLT language (or equivalent). The assembly language guides the assembly of the input data to the output file. In general, the expressiveness of the language allows designing action-style documents to accomplish specific ends.

With respect to the role of the stylesheet language instance document, an assembly run, in general, comprises stylesheet processor activity that is guided by a stylesheet language document. This guiding document, the XSLT stylesheet language instance document, needs to be present during the processing activity. As represented in the flow diagram of FIG. 5 via steps 502 and 504, after loading and checking the guiding document, the stylesheet processor (e.g., part of the mechanism 104) begins its running and outputting activities.

As described above, the content of the input document is processed in a linear fashion, first next last sequentially. Note that the input document is optional in a transformation by a stylesheet processor. For example, some guiding documents do not read an input document, whereby the input document may or may not be necessary. However, if present, the input document has to be present by the time the processor starts the running/outputting phase, at step 506.

In general, the output document is generated during the course of the running/outputting phase can only be output after processing the guiding document, and after processing the input (if any). It is the strict order of appearance requirement of these documents that characterizes the XML standard XSLT stylesheet processing activity (or equivalent).

Figure 5:
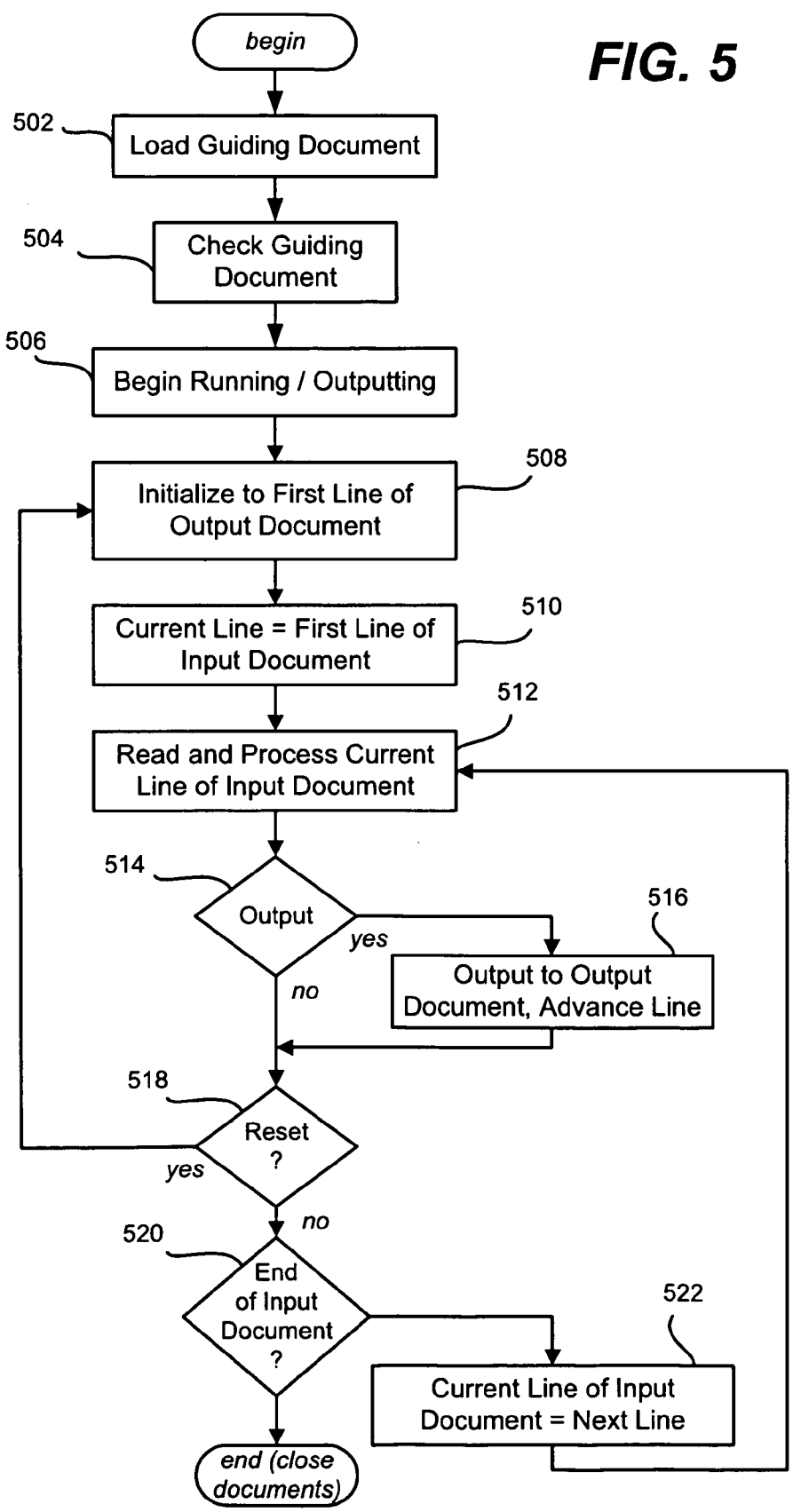
FIG. 5 is a flow diagram showing various aspects of transforming an input document into a structured output document.

Thus, in the example of FIG. 5, the output document starts at the top via step 508, and the first line of the input document is read as the current line and processed via steps 510 and 512. Note that it is possible that multiple input lines may need to be processed before an output line is written; is there is output from processing this input line, step 514 branches to step 516 to write the output, and advance the output to the next line. The input line is sequentially advanced each time it is read and processed via step 522; the only exceptions are a reset (step 518), or when the end of the input document is reached.

As described above, a reset is possible to the top of the document, which is represented by step 518 branching back to step 508 where the output is reinitialized to begin again, and step 510 where the current input line to read and process is again set to the first line. Note that it is feasible to reset the input line but not reset the output line, e.g., to append output following the reset, in which event step 518 branches to step 510 rather than step 508. When the end of the input document is reached, the output is ready; the files are closed, for example, and the output document is moved to the repository.

One example of a commercially available document transformation processor is an XSLT 1.0 XML standard processor. Any implementation that works as an interpreter and/or a compiler is sufficient. Other examples include an XSLT 2.0 XML standard processor and Microsoft Corporation's Powershell processor.

Fundamental operational behaviors of such a processor include that in a load phase, processing steps are guided by a stylesheet document. During a load guiding document phase, the processor first accepts a guiding document, which is loaded. After the guiding document is successfully accepted, then the machine moves to its 'run' phase; the guiding document is loaded completely first, before any other input or output takes.

The behavior of the processor during its run phase is determined by the guiding document. The guiding document specifies a mathematical function describing a mapping of outputs, which occur when triggered from the appearance of raw inputs. The standard processor, is given a valid instance of standard language, performs operational steps according to and only through the particular structure of this guiding document.

The running/outputting phase occurs once the transformation mechanism has already been loaded with the ability to provide appropriate output. The particular output results that can be issued are controlled by the guiding document, and the only output that can appear is in advance from the guiding document. In other words, while the order of output is determinable by the input, but what the output can be is determined by the guiding document.

The stylesheet language document describes how triggering events are detected; the stylesheet language document is made up of a series of the triggering events. In addition to read requests, there is provided a request for pattern matching, which when made, causes the processor to read the elements sequentially in the content. For each element read, a match is found among eligible matching templates. The stylesheet contains sequence constructors in matching templates, which are invoked when an input element read matches the pattern indicated by the template. In this mode of processing, the stylesheet contains several potential templates to construct and output content. But these templates are only activated when, and if, an element is read from the input document, and that element is the best match for the given template. In this mode, the order of appearance of the matching templates, in the guiding document, is secondary to the order of appearance of the input elements.

Turning to the concept of a factory-level stylesheet, this is generally used when a stylesheet needs to be generated such that the stylesheet itself may be called or invoked or triggered by other style sheets under various circumstances. This stylesheet may itself call other style sheets.

The style sheets for a given kind of configuration item, such as an application, have the same action style. An application item has a fixed set of actions which it performs. Actions include a set-output-target action that opens a new output document context, where subsequent output will be directed, a get-and-test applicability action, an enumerate instances action and a perform extended work action.

Any given stylesheet may be evaluated in combination with other style sheets. The style sheets for a given kind of configuration item, such as an application, have the same set of positions or roles of execution, which are part of their action style.

Configuration items may be combined as building blocks in various ways. For example, there may be an Operating system building block, a business policy building block, an application policy building block, a baseline (roll-up) building block, a software update building block, a driver(s) building block, and/or other building blocks (e.g., a general purpose building block, such as one that(may be used to encompass 'foreign' content not in constitutional format), and so on. The administrator puts these together to accomplish some task, and the mechanism 104 (FIG. 1), e.g., a factory, assembles them into a constitutional document, possibly by referencing other documents.

As described above, application configuration items may participate in a group configuration called 'parent-child'. When two items are in a parent-child situation, the parent is evaluated before the child. A model stylesheet which is a child declares another model stylesheet to be its parent, that is, unless the model declares that it has a base, then this stylesheet is not a child, whereas when a model declares that it has a base and names another model as its base or parent is the child, and the named model is the parent.

The parent-child relationship may be chained. Children name their parents. The model that is the last child model not named as a parent is the 'head'; the model that is the last model named as a parent, but not itself a child model (not naming a parent) is the 'foot'.

The head concept is somewhat similar to polymorphism in object oriented languages. In general, the same logical entity, the 'head', may be treated as belonging to more than one type.

Another relationship between models is called 'baseline-member'. In this case, the baseline model names its member models. A member model may be invoked in the context of being in a baseline.

Figure 6:
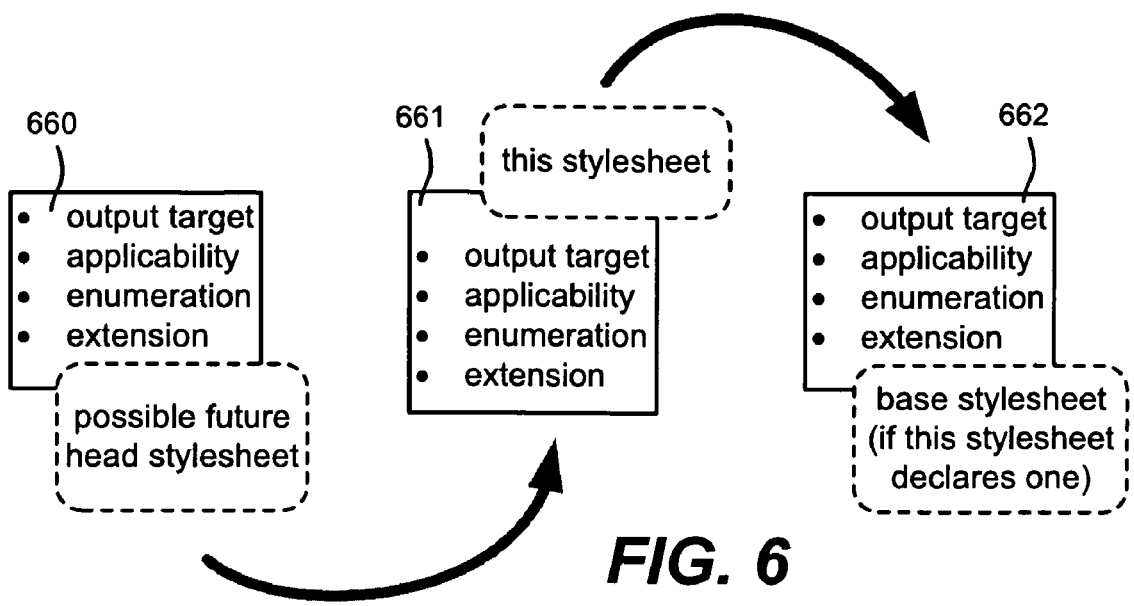
FIG. 6 is a representation of how stylesheets may be arranged relative to one another.

FIG. 6 illustrates the action style of application configuration items 660-662. The block 660 represents a possible future head stylesheet, relative to a particular ("this") stylesheet 661. The stylesheet 661 may declare a base stylesheet 662.

An aspect of the action-style document is directed towards acting in role as an available document within a function library 770. Somewhat like a base document, or via the base document mechanism, a document within a function library is imported or otherwise combined (e.g., via a rollup document, described below) to perform what is typically a commonly used action. By way of example, consider an action such as "apply to every user" that may be performed for numerous management tasks. An administrator may combine such as function with other tasks, including custom tasks, and thereby avoid re-duplicating efforts. For example, and administrator may put together management directives to get used disk space, and combine it with the "apply to every user" function, to get the disk space of each user. The same function may be combined with a "find which applications are used" document to find which applications are used by each user.

Figure 8:
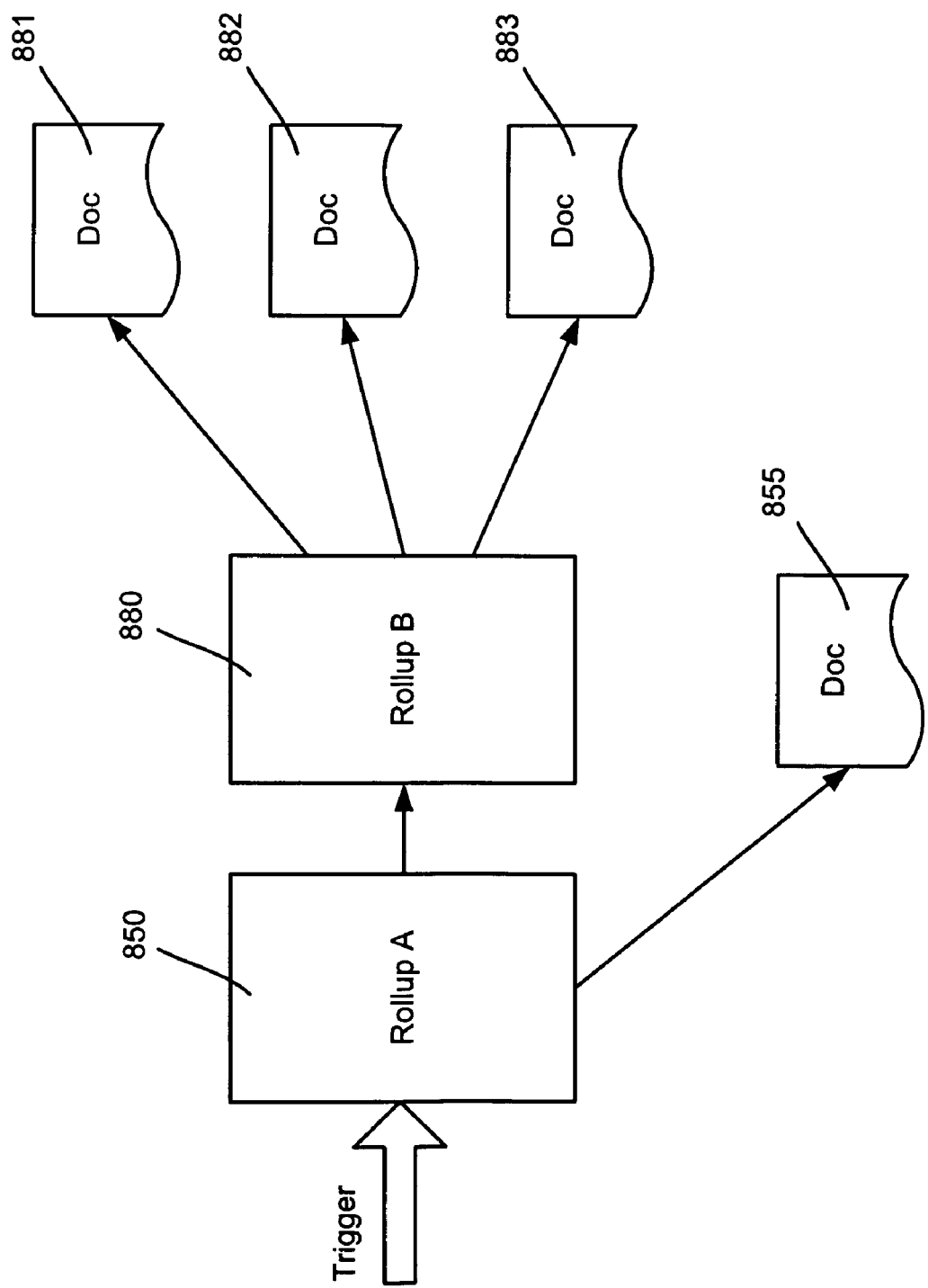
FIG. 8 is a block diagram representing example rollup document structures used in grouping and processing documents.

Turning to another aspect, a rollup document (also called a baseline document in the technology) is one which an administrator authors so as to treat two or more other documents as a unit. By way of example, FIG. 8 shows a rollup B 880 that specifies the processing of three (singleton) documents 881-883. A rollup may describe the order of execution, as well as the success/failure conditions for any or all of these documents. For example, the rollup 880 may specify that the documents are to be processed in the order of documents 881-883, or a certain one first and then the other two in any order, and so on. Further, the rollup may specify that document processing has to succeed for each document, or else all fail together. Alternatively, some subset may be treated together, e.g., documents 881 and 882 succeed or fail together, but document 883 can succeed or fail on its own.

A rollup thus gives an administrator control over ordering and/or success/failure considerations. As also shown in FIG. 8, a rollup itself may be controlled by a rollup, e.g., the rollup A 850 controls the processing (e.g., order and success/failure) of the rollup B 880 along with the document 855. Note that rollups may reference one or more other rollup documents, and/or singleton documents, and (in one implementation) only reference them, and do not contain the actual content of those documents.

As can be seen, there is provided a distributed computer management solution that requires fewer, or no, separately installed software components. There is one kind of processing document. There no global coordination required at processing time, e.g., when an agent at the managed computer wakes up to start its work, it already has everything it needs to execute, without delay. Reducing the need for special distribution, naming and security mechanisms dedicated solely to the delivery of the documents of a given vendor's solution.

Generally making the documents self-contained, so that they can be moved around without special protection or coordination.

To summarize one implementation, there are three kinds or roles of the stylesheets, comprising a factory role, which is present at the central repository site for authoring; a processing-time (or configuration, or self-sequencing) role, which is inside the constitutional document, and is dynamic sequencing logic which occurs when the model is processed (it is sequencing that is unique to this document); and a function library role. The function library is common functional processing which is pre-deployed to a client agency and is shared by all model documents being processed on the machine.

Client processing comprises generating another set of documents, the strongly-typed instance documents, which are themselves subject to an accept-time (like a load time) validation. Rule evaluation, actually rule predicate expression evaluation, occurs as a later activity, or phase, before processing ends. Thus, overall, client agent activity starts with a load-time validation of external documents, construction of internal documents, accept-time validation of internal documents, and then predicated expression evaluation.

These strongly-typed instance documents are distinguished by policy-typed instance documents and derived-typed instance documents. There is one policy-typed instance document for any given configuration item (described below), and it coordinates rule evaluation, which applies across the associated derived-type instance documents. There may be an unlimited, open-ended, number of occurrences of the derived-typed instance documents (the number of these may change from run to run).

For any given configuration item (considered by itself), there is a policy instance document which has a one-to-many relation to a set of derived-type instance documents. For any of the key configuration item usage scenarios, there is a 'constructing method' to arranging the types, rules and transforms for the strongly-typed instance documents.

These usage scenarios are accomplished through the arrangement of these instance documents, namely: to be a head is to have a policy instance document; to be a configuration item is to have a policy document and derived type documents in a one-to-many relation, to be a baseline is to have a policy type instance having relation to a multitude of derived-typed document of differing type; and to be an extension is to have multiple policy document for each member in the chain, each sharing the same set of derived type instance documents.

One implementation is based on schematic language supporting the SML (service modeling language) standard, which provides the extended ability to schema language to perform validation across/between multiple documents (concepts like sml:ref and sml:targetType). Further, these strongly-typed instance documents have cross-references between them, whereby in order to have a variable number of references to those documents, there is a predictable name generation pattern to construct the paths to those documents. These names are guaranteed not to conflict; one overall approach of being type-like, and being based on types, allows for a means to allocate those names.

There is further provided aspects related to a configuration item, e.g., a building block for operating system, application, business policy, update, and so forth), along with the structural members of configuration items (applicability, per-user scope, parts and settings).

A baseline, or rollup of such configuration item, provides for grouping by kind, with 'global rules' applicable across the configuration items within a section of a rollup. Also described is an extension in the form of a child with strongly typed 'parent part/setting references' between rollup in the chain.

Still further, there may be a designated-head, by which an existing set of documents may be re-purposed, without change, by changing which document is the head. Note that any configuration item is capable of operating in different positional roles.

With respect to implementing a management solution with low-overhead and high predictability, from the administrator/user perspective, the management solution may have one or more of the following 'type-like' concepts:

1. a config-item of a kind (having different kinds which can be enforced, having concepts of applicability, per-user enumeration (for each user apply), part-like entities, and setting-like entities)
2. a base-line of config-items of their kinds (grouping by kind, grouping in tree-like relations, and being able to apply rules to all participants in a group, rules over a group); and
3. an extension of one config-item (of a kind) by another config-item (of the same kind) (having behaviors from #1 work in extension relations, having 'parent references' that are strongly typed).

By a 'type-like' concept, it is meant that the admin-user may consider a request as being an modular unit, and abstract data type, with information hiding and modularity benefits, which combines the three aspects of schemamatic, transformative and ruling. Being type-like, as a benefit, facilitates concepts such as re-usability, extensibility and less coupling between units.

Such type-like notions are implemented using a single transmission format, namely a constitutional document, with client agent processing performed by XML standard processors. This provides a powerful processing capability with a relatively very small 'agent' with very little custom code.

After the load-time phase (as described in the aforementioned related patent application), the processing or running phase of a set of policy documents includes the act of constructing another set of documents in working memory, called the strongly-typed instance documents, and performing processing over them. The running phase is generally a construction activity, an acceptance activity (comparable to load-time phase), a decision to continue, and a ruling phase.

In one implementation, there are three kinds of dynamic relationship activities, between documents, performed by constitutional documents, including factory-style (building-block, building-up, building-out, building block exchange, assembling, constructing), aggregating-style (rolling-out, rolling-up, sequencing, calling-in-order, dispatching, who-first, who-next, start, stop), and functional-library-style (per-usage, for-each, for all, search-by-level, search-by-tree).

Document targeting is task activity delegation. That a constitutional document enables or does this activity, and that, when a processing agent receives such a document, the agent gains the ability to do that activity. So the creation of a kind of document, and the targeting of that document to a processing agent, delegates that work to be done there.

Any kind of computer may receive a document, e.g., a "client" may be a server, or other non-typically managed machine. Factory activity is a delegated task that can be assigned. The factory activity (translating an end-user desire into a constitutional document), is an activity that is also performed by a constitutional document. Thus, the task of doing document-to-document translation, or document generation into a repository, may be an assigned task; a factory activity is processing by a server agent instead of a client agent.

Exemplary Operating Environment

Figure 9:
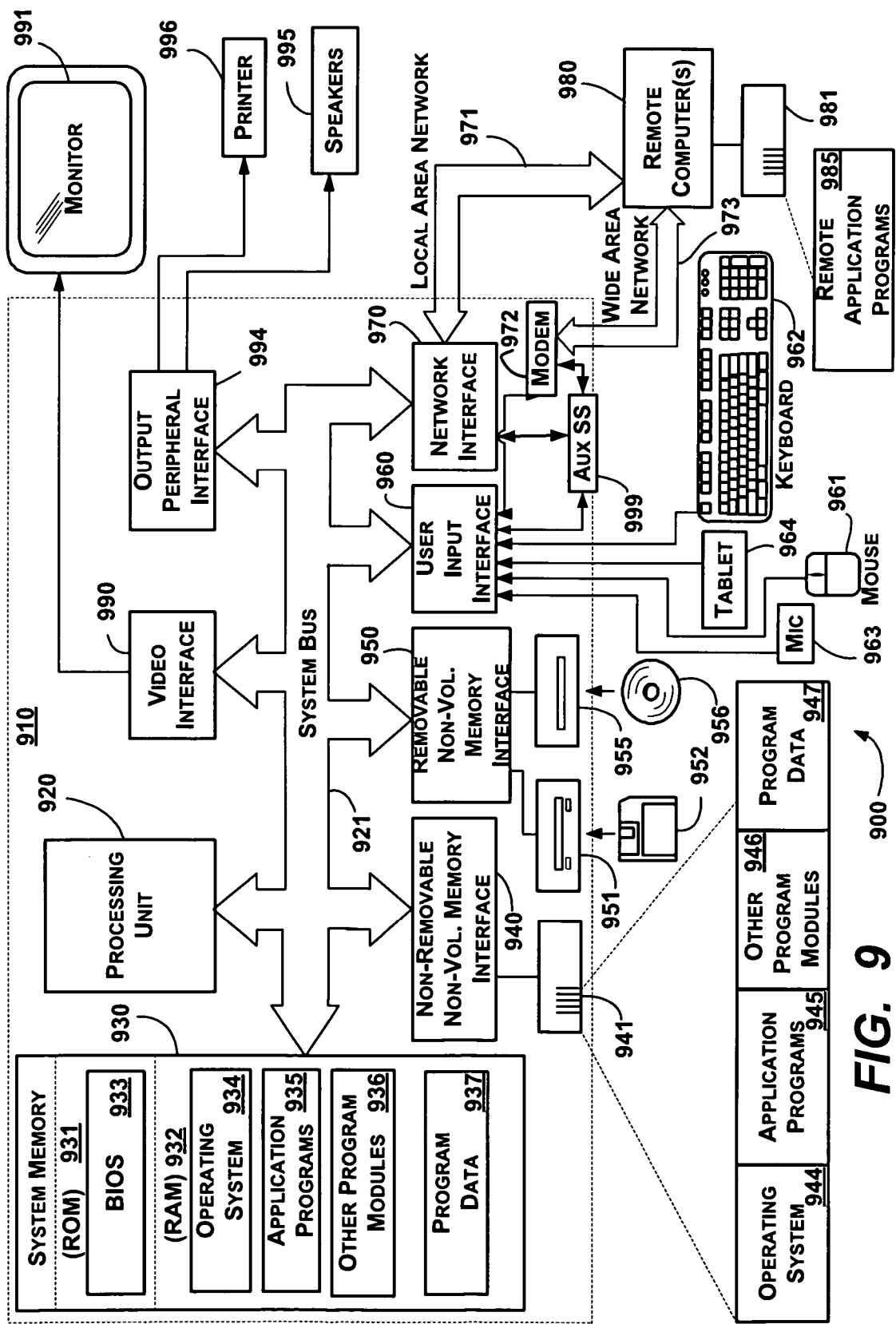
FIG. 9 shows an illustrative example of a computing environment into which various aspects of the present invention may be incorporated.

FIG. 9 illustrates an example of a suitable computing and networking environment 900 on which the examples and/or implementations of FIGS. 1-8 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, embedded systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936 and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 955 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

Figure 7:
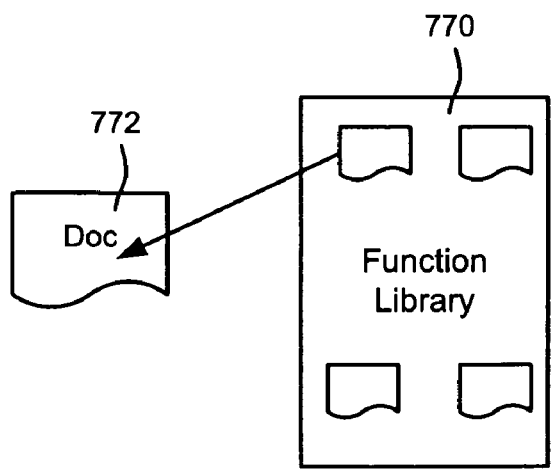
FIG. 7 is a block diagram representing a relationship between a document and a document of a function library.

The drives and their associated computer storage media, described above and illustrated in FIG. 9, provide storage of computer-readable instructions, data structures, program modules and other data for the computer 910. In FIG. 7, for example, hard disk drive 941 is illustrated as storing operating system 944, application programs 945, other program modules 945 and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 950 that is coupled to the system bus, but may be connected by other interface and bus structures, such as a parallel port, game port or a constitutional serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 950 or other appropriate mechanism. A wireless networking component 974 such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are exemplary and other means of establishing a communications link between the computers may be used.

An auxiliary subsystem 999 (e.g., for auxiliary display of content) may be connected via the user interface 950 to allow data such as program content, system status and event notifications to be provided to the user, even if the main portions of the computer system are in a low power state. The auxiliary subsystem 999 may be connected to the modem 972 and/or network interface 970 to allow communication between these systems while the main processing unit 920 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising:
   an authoring mechanism by which an author specifies machine configuration policy;
   a transformation mechanism coupled to the authoring mechanism that formalizes the configuration policy into at least one action-style document stored in a repository, wherein the transformation mechanism processes the configuration policy into an output document comprising a structured document that is related to the action-style document comprising at least one schematic language statement, at least one data transformation and at least one data rule;
   a targeting and assignment mechanism that identifies a set of action-style documents in the repository for distribution to targeted network machines, the targeting and assignment mechanism being independent of the authoring mechanism and the transformation mechanism; and
   a distribution mechanism coupled to the targeting mechanism to distribute the set of action-style documents to the targeted network machines, each targeted network machine including an agent that executes the set of action-style documents to perform a management task on that targeted network machine.

2. The system of claim 1 wherein the transformation mechanism comprises a standard XSLT stylesheet processor.

3. The system of claim 1 wherein the agent uses the action-style documents as a guide in processing an input document into output that performs the management task.

4. The system of claim 1 wherein the agent uses the action-style documents as a factory to produces a constitutional document.

5. The system of claim 1 wherein the structured document corresponds to an output document, and wherein the transformation mechanism transforms input lines of an input document into output lines of an output document by loading a guide document and serially reading lines of the input document to produce the output lines based on information in the guide document.

6. The system of claim 5 wherein the transformation mechanism includes means for validating the guide document.

7. The system of claim 5 wherein the transformation mechanism transforms the input lines according to a rule-factory document used as a guide document.

8. The system of claim 5 wherein the transformation mechanism transforms the input lines according to a rule-construct role document used as a guide document.

9. The system of claim 5 wherein the transformation mechanism transforms the input lines according to a type-function role document used as a guide document.

10. In a computing environment, a method comprising;
    using a processing unit, loading an action-style document;
    using the action-style document to produce an other document directed towards performing a management task, wherein using the action-style document comprises generating a constitutional document comprising at least one schema type, at least one rule and at least one action style; and
    processing the other document for performing the management task.

11. The method of claim 10 wherein processing the other document for performing the management task comprises processing a rollup document that groups together other documents.

12. The method of claim 10 wherein processing the input document comprises loading a rule-factory role document as the action-style document for used as a guide document by a processor.

13. The method of claim 10 wherein processing the input document comprises loading a rule-construct role document as the action-style document for used as a guide document by a processor.

14. The method of claim 10 wherein processing the input document comprises loading a type-function role document as the action-style document for used as a guide document by a processor.

15. In a computing environment, a method comprising:
receiving authored machine policy;
formalizing the authored machine policy into a structured document, wherein the structured document comprises at least one schema type, at least one rule and at least one action style; and
processing the structured document to perform a management task, including loading an action-style document, and using the action-style document as a guide document to transforming lines of the structured document into output that when executed performs the task.

16. The method of claim 15 wherein formalizing the authored machine policy into a structured document comprises referencing another document within the structured document.

17. The method of claim 15 further comprising, maintaining the structured document in a repository, and distributing the structured document to managed machines for processing to perform the management task.

18. The method of claim 15 further comprising, including information in the action-style document that relates the action-style document to another action-style document.

* * * * *

UNITED STATES PATENT AND TRADEMARK OFFICE
CERTIFICATE OF CORRECTION

PATENT NO. : 7,774,442 B2  
APPLICATION NO. : 12/147202  
DATED : August 10, 2010  
INVENTOR(S) : William B. Lees et al.

Page 1 of 1

It is certified that error appears in the above-identified patent and that said Letters Patent is hereby corrected as shown below:

In column 14, line 56, delete "945" and insert -- 946 --, therefor.

Signed and Sealed this
Eighth Day of February, 2011

David J. Kappos
*Director of the United States Patent and Trademark Office*